United States Patent
Ashbrook et al.

(10) Patent No.: US 9,639,850 B2
(45) Date of Patent: May 2, 2017

(54) SYSTEMS AND METHODS FOR INCENTIVIZING CONTENT ENGAGEMENT

(75) Inventors: Jeffrey R. Ashbrook, North Hollywood, CA (US); Kyle Prestenback, Los Angeles, CA (US); Evan Acosta, La Crescenta, CA (US); Brian Kwan, Pasadena, CA (US); David Jessen, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1055 days.

(21) Appl. No.: 12/895,122

(22) Filed: Sep. 30, 2010

(65) Prior Publication Data
US 2012/0082426 A1 Apr. 5, 2012

(51) Int. Cl.
| | |
|---|---|
| H04N 9/80 | (2006.01) |
| H04N 5/775 | (2006.01) |
| G06Q 30/02 | (2012.01) |
| G06Q 30/06 | (2012.01) |
| H04N 5/85 | (2006.01) |
| H04N 9/87 | (2006.01) |
| H04N 21/426 | (2011.01) |
| H04N 21/432 | (2011.01) |
| H04N 21/4784 | (2011.01) |
| H04N 21/482 | (2011.01) |
| H04N 21/658 | (2011.01) |

(52) U.S. Cl.
CPC ..... *G06Q 30/0207* (2013.01); *G06Q 30/0631* (2013.01); *H04N 5/85* (2013.01); *H04N 9/8715* (2013.01); *H04N 21/42646* (2013.01); *H04N 21/4325* (2013.01); *H04N 21/4784* (2013.01); *H04N 21/4826* (2013.01); *H04N 21/6582* (2013.01)

(58) Field of Classification Search
USPC ................................. 386/239–248, 353–357
See application file for complete search history.

(56) References Cited

U.S. PATENT DOCUMENTS

| | | | |
|---|---|---|---|
| 2007/0079333 A1* | 4/2007 | Murakami et al. | ............ 725/46 |
| 2007/0123185 A1* | 5/2007 | Welk | ................... G11B 27/031 455/166.2 |
| 2009/0172737 A1* | 7/2009 | Miki | ............................ 725/46 |
| 2010/0071005 A1* | 3/2010 | Kusunoki | ......... G06F 17/30781 725/46 |

* cited by examiner

*Primary Examiner* — Hung Dang
(74) *Attorney, Agent, or Firm* — Ference & Associates LLC

(57) ABSTRACT

Systems and associated methods for incentivizing content engagement are described. Embodiments provide a recommended feature application to offer premier/recommended content. This can take place at a variety of times, for example during the primary content selection interface display, as well as offering said content interactively as an overlay during the conclusion of a piece of content. Embodiments employ a weighted process for selecting a recommended feature based on one or more stored preference files. The recommended feature application can be utilized across titles.

12 Claims, 7 Drawing Sheets

SYSTEMS AND METHODS FOR INCENTIVIZING CONTENT ENGAGEMENT

BACKGROUND

Media players, such as optical and magneto-optical disc players (DVD players or BLU-RAY DISC players), are popular for viewing audio-visual content such as movies, games and the like. Most modern players access media content stored on a multi-media disc via an optical drive. Newer formats for discs, such as the BLU-RAY DISC, provide an optical disc storage medium designed to supersede the standard DVD format and have a large storage capability, such as suitable for storing high-definition (HD) video content and other data. The BLU-RAY DISC typically provides up to 25 GB per single-layer disc, and 50 GB per dual-layer disc. These figures represent standard storage, however, and the BLU-RAY specification is open-ended. BLU-RAY DISC is a registered trademark of BLU-RAY DISC ASSOCIATION in the United States and other countries.

BRIEF SUMMARY

In summary, one aspect provides a method for incentivizing content engagement comprising: responsive to determining a multi-media disc inserted into an optical drive of a media player is recommended feature enabled, accessing one or more recommended feature preference files; utilizing the one or more recommended feature preference files to select a recommended feature; and displaying a selection option for the recommended feature.

Another aspect provides a computer program product for incentivizing content engagement comprising: a computer readable storage medium having computer readable program code embodied therewith, the computer readable program code comprising: computer readable program code configured to, responsive to insertion of a multi-media disc that is recommended feature enabled into an optical drive of a media player, access one or more recommended feature preference files; computer readable program code configured to utilize the one or more recommended feature preference files to select a recommended feature; and computer readable program code configured to display a selection option for the recommended feature.

A further aspect provides a system for incentivizing content engagement comprising: one or more processors; and a memory operatively connected to the one or more processors; wherein, responsive to execution of computer readable program code accessible to the one or more processors, the one or more processors are configured to: responsive to determining that a multi-media disc inserted into an optical drive of a media player is recommended feature enabled, access one or more recommended feature preference files; utilize the one or more recommended feature preference files to select a recommended feature; and display a selection option for the recommended feature.

The foregoing is a summary. For a better understanding of example embodiments, together with other and further features and advantages thereof, reference is made to the following description, taken in conjunction with the accompanying drawings, and the scope of the invention will be pointed out in the appended claims.

DETAILED DESCRIPTION

Figure 1:
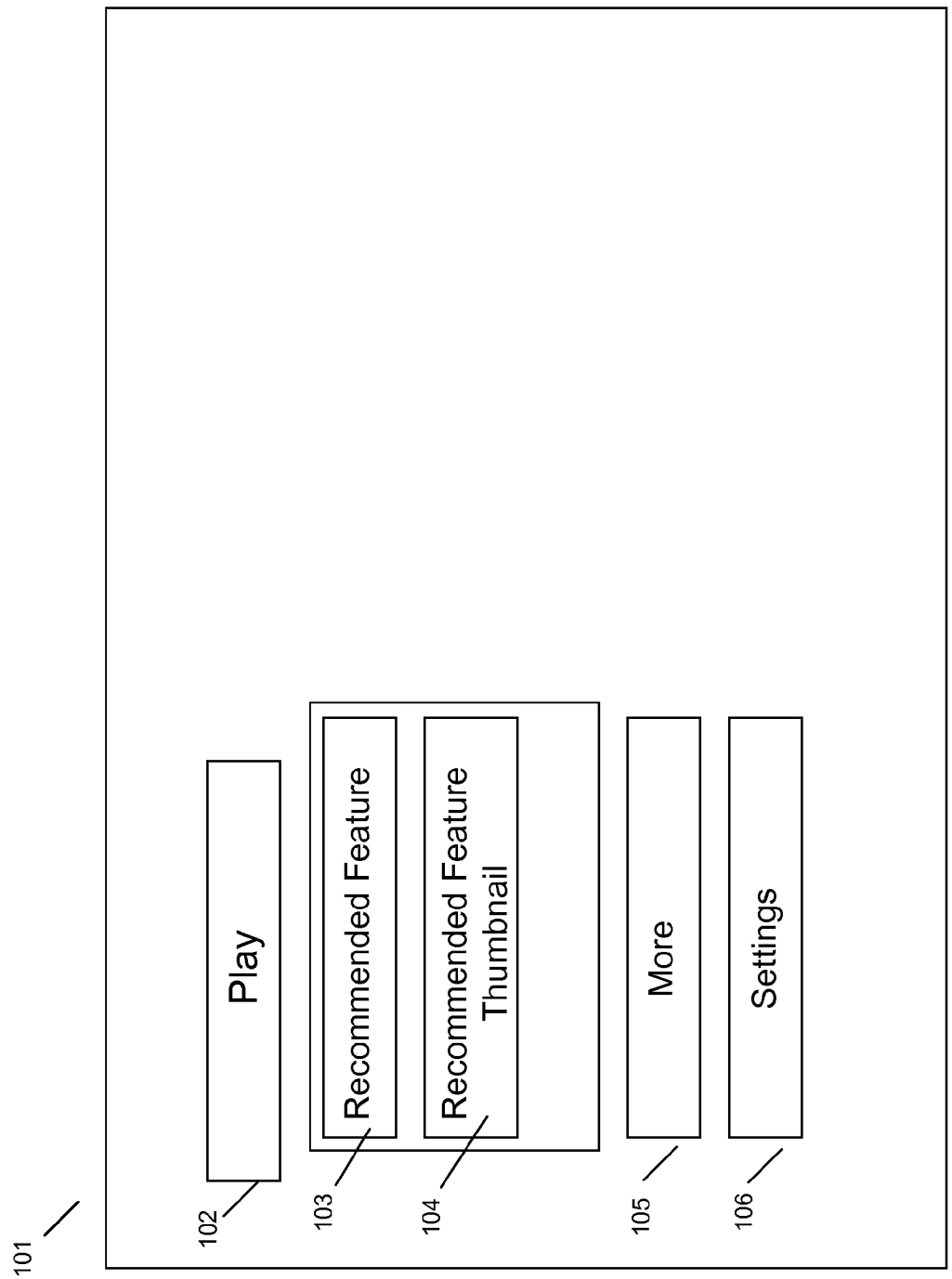
FIG. 1 illustrates an example main menu.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments.

Reference throughout this specification to embodiment(s) means that a particular feature, structure, or characteristic described in connection with the embodiment is included in at least one embodiment. Thus, appearances of the phrases "certain embodiments" or "example embodiment" or the like in various places throughout this specification are not necessarily all referring to the same embodiment.

Some useful information regarding autoplay/fastplay applications is provided by co-pending and commonly assigned U.S. patent application Ser. No. 10/757,089, entitled "FAST PLAY DVD", filed on Jan. 13, 2004, and co-pending and commonly assigned U.S. patent application Ser. No. 12/895,025, entitled "SYSTEMS AND METHODS FOR DYNAMIC CONTENT PLAY LIST CREATION", filed concurrently herewith, both of which are incorporated by reference here. Some useful information regarding managing settings across titles is provided by co-pending and commonly assigned U.S. patent application Ser. No. 12/895,144, entitled "SYSTEMS AND METHODS FOR SETTINGS MANAGEMENT ACROSS MULTIPLE TITLES", filed concurrently herewith, incorporated by reference here.

At the outset, the following terms are given the following meanings herein. Application refers to a program module or executable program having computer readable program code configured to achieve a stated function. An application, for example a recommended feature application, as described further herein, can be written in any acceptable programming language, such as JAVA, and is loaded by the media player to perform the stated functionality. Applications can be stored in a variety of locations, including on a multi-media disc, on a local storage device of the media player (hard drive/binding unit, et. cetera), on a remote device, or any suitable combination of the foregoing.

On media devices, there is currently a problem where premier/relevant content is given the same visual/interface attention as less relevant content. For example, current menus for BLU-RAY DISCS provide essentially the same display format for all content offered by a title. There are no true sub-menu options for recommended features on current discs.

Accordingly, embodiments provide a mechanism to offer premier/recommended content. This can take place at a variety of times, for example during the primary content selection interface display (top menu or main menu), as well as offering said content interactively as an overlay during the conclusion of a piece of content, as by way of a popup menu.

Embodiments allow the user to have easier access to premier/relevant content. To accomplish this, embodiments employ a weighted process for selecting a recommended feature. For example, embodiments take into account whether the content has already been viewed, the content's priority, a record of user choice(s)/preferences when selecting content, and if the media player, such as a BLU-RAY DISC player, is connected a remote device, for example via an Internet connection, and therefore has access to a "most popular" and/or a recommended piece of content based on other users' preferences. Thus, embodiments provide a mechanism that enables the user to find premier/recommended content without having to search through several pages of menus. The mechanism can also offer a new piece of content at the end of another piece of content.

A recommended feature is an extension of the top-menu (main menu) display for a title. The top menu for example displays one of two items in the recommended feature region, namely a locally generated recommended feature or a remotely generated recommended feature, for example, most popular among BLU-RAY users via BD live. An additional recommended feature prompt can be displayed at a variety of times via a popup menu or display, for example after the main feature (movie) has played.

To generate a recommended feature, a set of locally stored files (for example, stored on the media player binding unit/hard drive) can be utilized. One file type may be accessible (both read and write) by all titles that implement a recommended feature application, as further described herein. Another file type may be accessible only to the currently inserted disc.

Embodiments employ a process to determine which recommended feature to display and assists in determining which group of play list(s) should be used for the main menu loop. If the binding unit is not available or sufficient space does not exist to create the required file(s), the process follows a logic as if it were the first time the user has inserted a recommended feature enabled disc into his or her media player (binding unit errors are ignored).

The description now turns to the figures. The illustrated example embodiments will be best understood by reference to the figures. The following description is intended only by way of example and simply illustrates certain embodiments representative of the invention, as claimed.

Referring to FIG. 1, an example main menu is illustrated. The main menu 101 includes a plurality of selections 102, 103, 105, 106. The main menu can also include one or more displays, such as a recommended feature thumbnail 104 and main menu loop media (not shown). The main menu is a user interface derived from an application and provides selections for the user to navigate content. For example, the illustrated main menu 101 includes a play selection 102, a recommended feature selection 103, a recommended feature thumbnail 104, a more selection 105, and a settings selection 106. The recommended feature selection 103 and the recommended feature thumbnail 104 are the focus of this description. The recommended feature thumbnail 104 includes a display, such as a preview, of the recommended feature that is selected by the recommended feature application. This recommended feature thumbnail is preferably displayed along with the recommended feature selection 103 to attract the user's attention; however, this is not essential.

Figure 2:
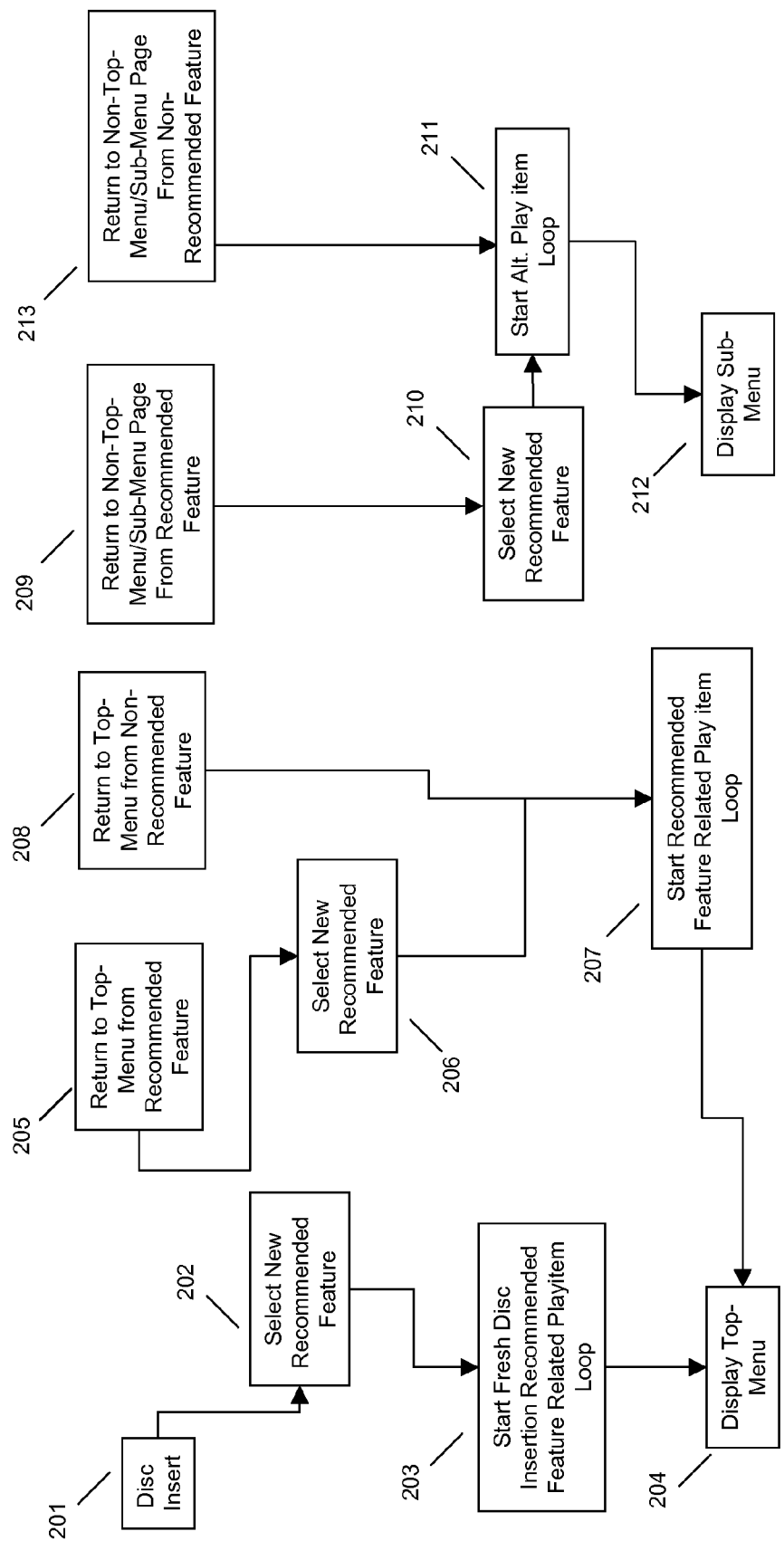
FIG. 2 illustrates an example flow of recommended feature application activation processing.

Referring to FIG. 2, an example flow of recommended feature application activation processing is illustrated. The recommended feature application can be activated at a variety of times, for example on disc insertion and after viewing the recommended feature or another (non-recommended) feature.

On a disc insertion 201, the recommended feature application will select 202 a recommended feature for display on the main menu 101. This includes running the selection processing for the recommended feature selection, as further described herein. Once a recommended feature has been selected, a fresh disc insertion recommended feature related playitem loop is started 203. This corresponds to compiling the necessary data items to display the top menu 204 along with the recommended feature, the recommended feature thumbnail, and the media played in the loop for the top menu.

If a disc has been previously inserted and the user has chosen to view the recommended feature, on return to the top menu from the recommended feature 205, the recommended feature application selects a new recommended feature 206, and starts the recommended feature related playitem loop 207, which is output as a display of the top menu 204.

If the user has selected to view another feature which is not the recommended feature, on returning to the top menu from that feature 208, the recommended feature application simply starts the recommended feature related playitem loop without the need to select a new recommended feature. This is because the recommended feature selected on disc insertion 202 has not yet been viewed.

If the user has selected to view the recommended feature and then navigates to a sub-menu 209, the recommended feature application selects a new recommended feature 210 and starts an alternative playitem loop 211 for display on the sub-menu. The alternative playitem loop is selected to distinguish the sub-menu from the top menu.

Finally, if the user has selected to view a non-recommended feature and returns to a sub-menu from the non-recommended feature, the recommended feature can simply start the alternative playitem loop without selecting a new recommended feature. This is because the recommended feature selected on disc insert 202 has not yet been viewed.

Figure 3:
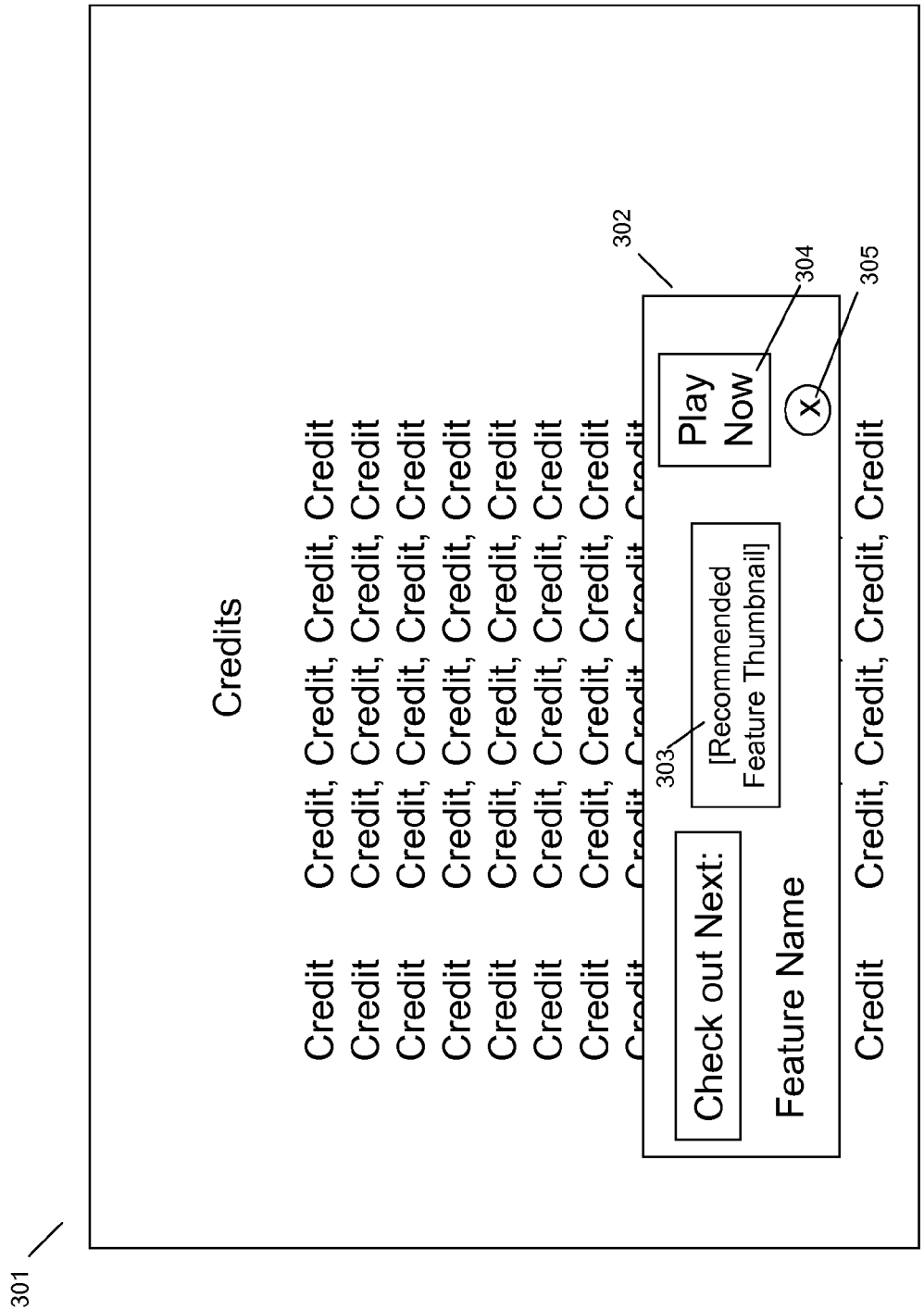
FIG. 3 illustrates an example recommended feature popup menu.

Referring to FIG. 3, an example recommended feature popup menu is illustrated. The recommended feature popup menu 302 can be displayed over the main screen display 301 at a variety of times. One example includes displaying the recommended feature popup menu 302 automatically once the main feature (for example, a movie) has finished and the credits are rolling. The recommended feature popup menu 302 comprises a displayed user interface with a variety of selections that allow the user to navigate to other content. For example, the illustrated recommended feature popup 302 of FIG. 3 includes a recommended feature thumbnail 303, a play now selection 304, and an "X" 305. The recommended feature thumbnail 303 provides a preview of the recommended feature contents, such as an image or a video, and the play now selection 304 gives the user the option to select it for viewing the recommended feature. If the user does not select the play now selection 304, the recommended feature popup 302 can dissolve after a predetermined time, for example 15 seconds. Moreover, if the user wants to view the credits (for example because they contain outtakes), the user can simply select the "X" at any time to close the recommended feature popup menu 302.

Figure 4:
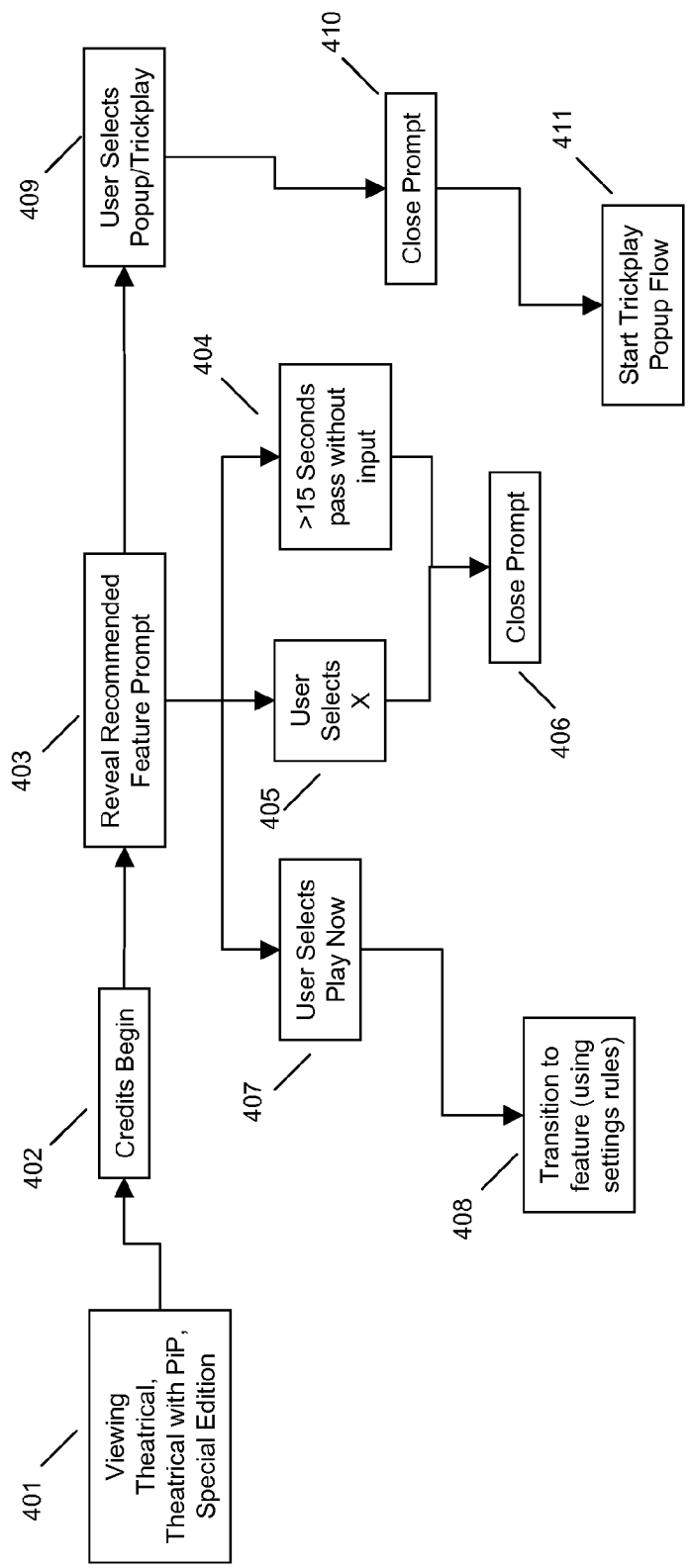
FIG. 4 illustrates an example flow for recommended feature application popup menu processing.

Referring to FIG. 4, an example flow for recommended feature application popup menu processing is illustrated. If the user is viewing the main theatrical feature of the title 401, once the credits begin (or at any other suitable time), the recommended feature application reveals the recommended feature prompt 403. The recommended feature prompt can include for example the recommended feature popup menu 302 illustrated in FIG. 3.

If the user selects play now 407, the user is taken to the recommended feature 408. If the user selects "X" 405 or if the user does not interface with the media player for a predetermined time 404, in this illustrated example 15 seconds, the prompt will close 406. If the user selects the popup button or trickplay (for example, fast forward) 409, the prompt will close 410 and the trickplay popup flow will begin 411.

Figure 5:
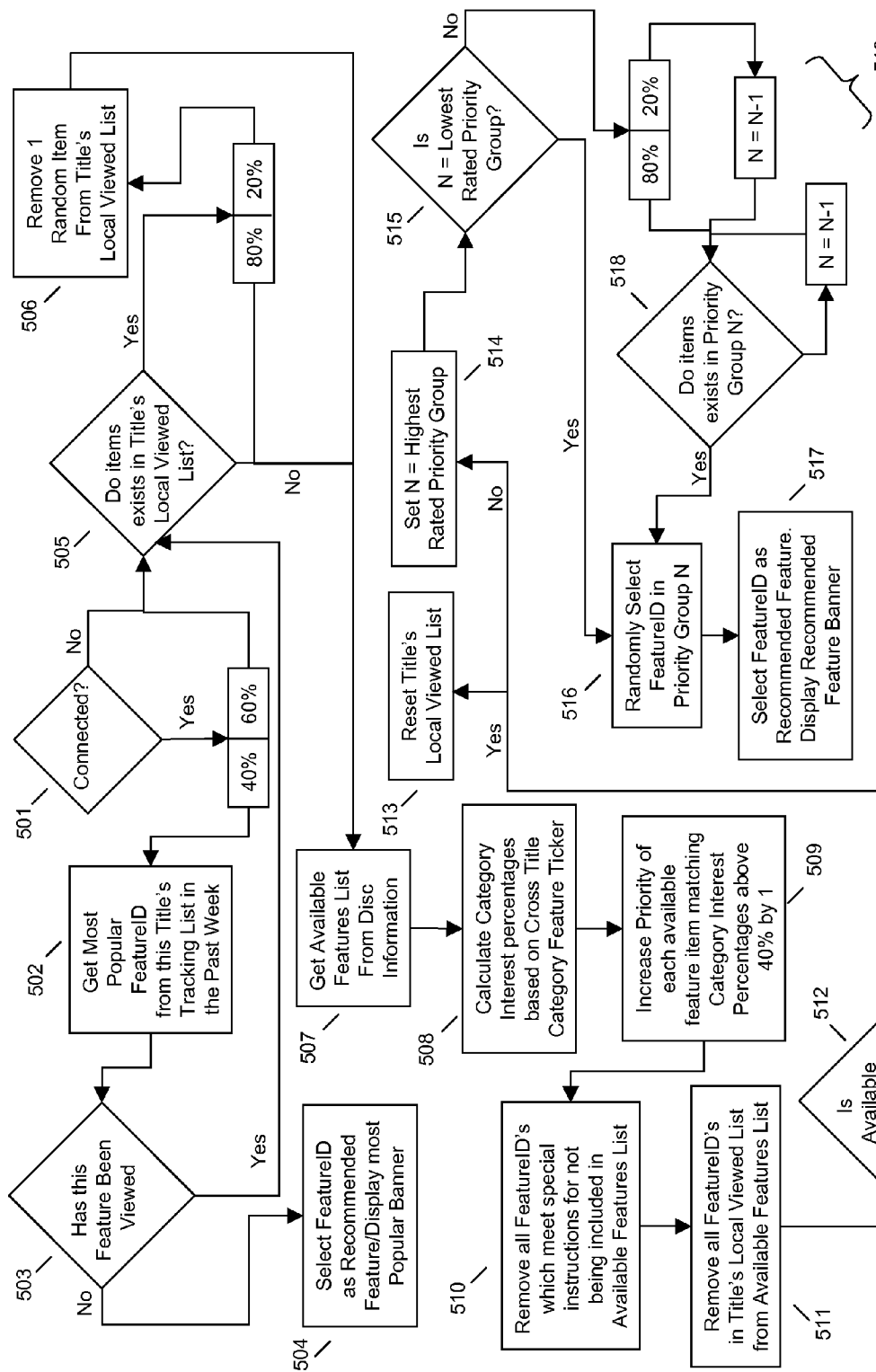
FIG. 5 illustrates an example flow for recommended feature selection.

FIG. 5 illustrates an example flow for recommended feature selection. Essentially, the recommended feature application selects a recommended feature based on locally derived preferences and/or on externally provided preferences, as represented in one or more recommended feature preference files. The externally provided preferences could be predefined by the content producer and hard coded into the feature selection application. Additionally, the externally provided preferences can be accessed from a remote device, such as a remote server that is dynamically updated with a most popular ranking for features that can be recommended.

The media player stores a variety of files in the binding unit useful in selecting an appropriate recommended feature. Certain files, for example a list of features the user has viewed for a current disc, need only be accessible to the currently viewed title. A local title viewed feature list file is a data file that keeps track of the recommended features that have been viewed from a particular title. This files' format can be for example a list with the following data: [Feature Name/ID].

Certain files are preferably hard coded into the local media player memory. These hard coded files include for example a mapping of content (for example, bonus material content under the more selection 105 of the main menu 101) to a content category, and available recommended features list(s).

Certain files should be stored in media player local memory for access by all enabled discs (across titles). For example, a cross title category feature ticker file, which is a data file that keeps track of the number of times a particular feature type (category) is viewed. This file's format can be for example a list with the following data: [CATEGORY_ID] [NUM], where NUM is the total number of times a feature that is labeled with the category has been viewed.

In addition to files stored on the multi-media disc and/or the local media player memory, server side actions can exist. These server side actions can influence the selection of a recommended feature in a variety of ways. The server side actions can for example report or retrieve information on the most popular feature per title. These service actions can be stored locally in the media player local memory or pulled from the server's database at various appropriate times. The server's database can for example include a unique list of most popular features for recommendation for each title.

Each disc, for example a BLU-RAY DISC, can support the ability to poll service actions that retrieve the number of views in the past predetermined time (for example, the last week) per feature ID, retrieve name/ID with the largest number of views in the past predetermined time, et cetera. Moreover, each disc can support the ability to send data to service actions that send the feature ID that is currently being viewed, for example if it is from the recommended feature list. A mediator server can be configured to contain a database of titles with feature names/IDs and a list of times (date stamp) that each feature was viewed for each feature name/ID. Supporting such reporting/retrieving of preferences facilitates determination of community preferences, both for features, titles and across all titles.

Given the available preference data from local or external sources, embodiments priority rank recommended features to form a ranked recommended features list. Features can be placed into priority groups. From the recommended features list, a recommended feature can be selected, as for example by selecting the feature from a priority group with the highest priority, or randomly selecting a feature from the priority group. Table 1 illustrates examples of recommended features and priority values that may form a recommended features list.

TABLE 1

Sample Recommended Features and Priority Values

| Profile 1.1 Player List: | Profile 2.0 Player List: |
|---|---|
| Beyond Beauty 2 | Beyond Beauty 2 |
| Enchanted Debut -On Broadway 1 | Enchanted Debut -On Broadway 1 |
| Beauty and the Beast Board Game 3 | Beauty and the Beast Board Game 3 |
| Sneak Peaks 4 | Disney Game Connection: Beauty Edition 2 |
|  | BDLive Logo 3 |
|  | Sneak Peaks 4 |

FIG. 5 illustrates a specific, non-limiting example of recommended feature selection processing. A determination is made as to whether the media player is connected 501, for example has a working Internet connection such that remote devices may be accessed. If the media player is connected, then a remote database can be contacted (for example, 40% of the time) to retrieve 502 an external recommended feature preference, such as the most popular feature ID for the title across all connected users for the past week. The recommended feature application determines if this externally derived recommended feature preference is a viable option for this user. For example, it is determined if the user has already viewed the feature identified as most popular across all users 503. If so, the recommended feature can be selected as if the media player was not connected. If the user has not yet viewed this feature, it can be selected as the recommended feature 504.

If the player is not connected or the externally provided preference information is not utilized, it is determined if items exist in the title's local viewed list 505. For example, the recommended feature application determines if local title viewed feature list file contains entries indicating one or more features have already been viewed. If so, the recommended feature is preferably not selected from among the already viewed features. Thus, an item is removed 506 from the file (for example, 20% of the time) and the available features list is retrieved 507 from the disc currently inserted. If the local title viewed feature list file does not contain items, the available features list is directly retrieved from the disc 507.

The recommended feature application calculates a priority value for each feature. For example, interest percentages are calculated 508 for each feature in the available list based on cross title category feature ticker file values for the given feature IDs. The priority value is increased 509 for each available feature/item matching the category interest percentages having a value above a predetermined threshold, for example, 40%. Thus, if the ticker file indicates that a user has viewed bonus materials 90% of the time, and has viewed a related game only 10% of the time, the priority value for the current discs bonus features is increased, for example by 1.

Optionally, all features that are specifically coded to not be included as recommended features can be removed 510. For example, the producer of the content may specify that certain features are not to be included in the recommended features list. Additionally, features that occur in the titles local viewed list can be removed so as to not recommend an already viewed feature as a recommended feature 511.

It is determined if the available features list is empty 512. If so, the title's local viewed list is reset 513 such that the locally viewed titles may be included in the recommended feature list, and the selection process of a recommended feature iterates (for example, the process can restart at 507). If the available features list is not empty, N is set equal to the highest rated priority group 514. It is determined if N=the lowest priority group's value 515. If so, a feature is selected from priority group N 516. A feature ID is selected as the recommended feature and is displayed in the appropriate menu, sub-menu or popup display 517. If N does not equal the lowest rated priority group, it is determined if items exist in the established priority group at 518. If so, a feature from that group can be selected 516. For example, 80% of the time the established priority group is the existing priority group. Alternatively, for example 20% of the time, a lower ranked priority group is selected. This process can iterate 519 until a priority group is determined to contain an item that can be selected 516.

Figure 6:
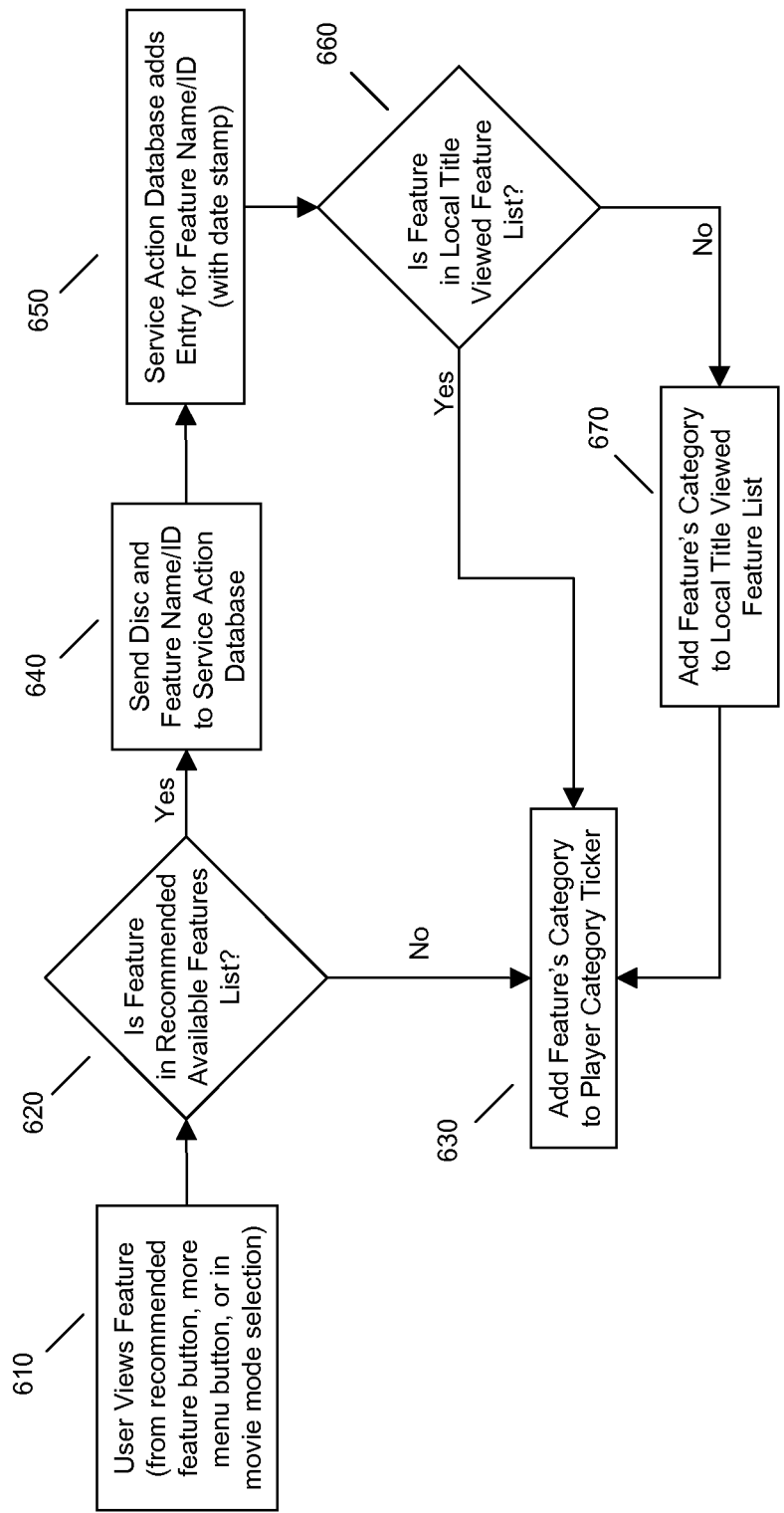
FIG. 6 illustrates an example flow of file and service action reporting and recording.

Referring to FIG. 6, an example flow of file and service action reporting and recording is illustrated. The recommended feature application records locally the viewed feature (in order to store user preferences) and reports the viewed feature to a remote database such that others can take the user's preferences into account (as an externally derived preference such as most popular). When the user selects to view a feature 610, the recommended feature application determines 620 if the feature is in the recommended features list. If not, the feature's category is added to the ticker. If the feature is in the recommended features list, the disc and feature name/ID are sent 640 to the service action database. The service action database adds 650 the entry for the feature name/ID with a date stamp. It is next determined 660 if the feature is in the local title viewed feature list. If so, the features category is added to the ticker. If not, the features category is added to the local title viewed feature list 670 and the feature's category is added to the ticker.

Figure 7:
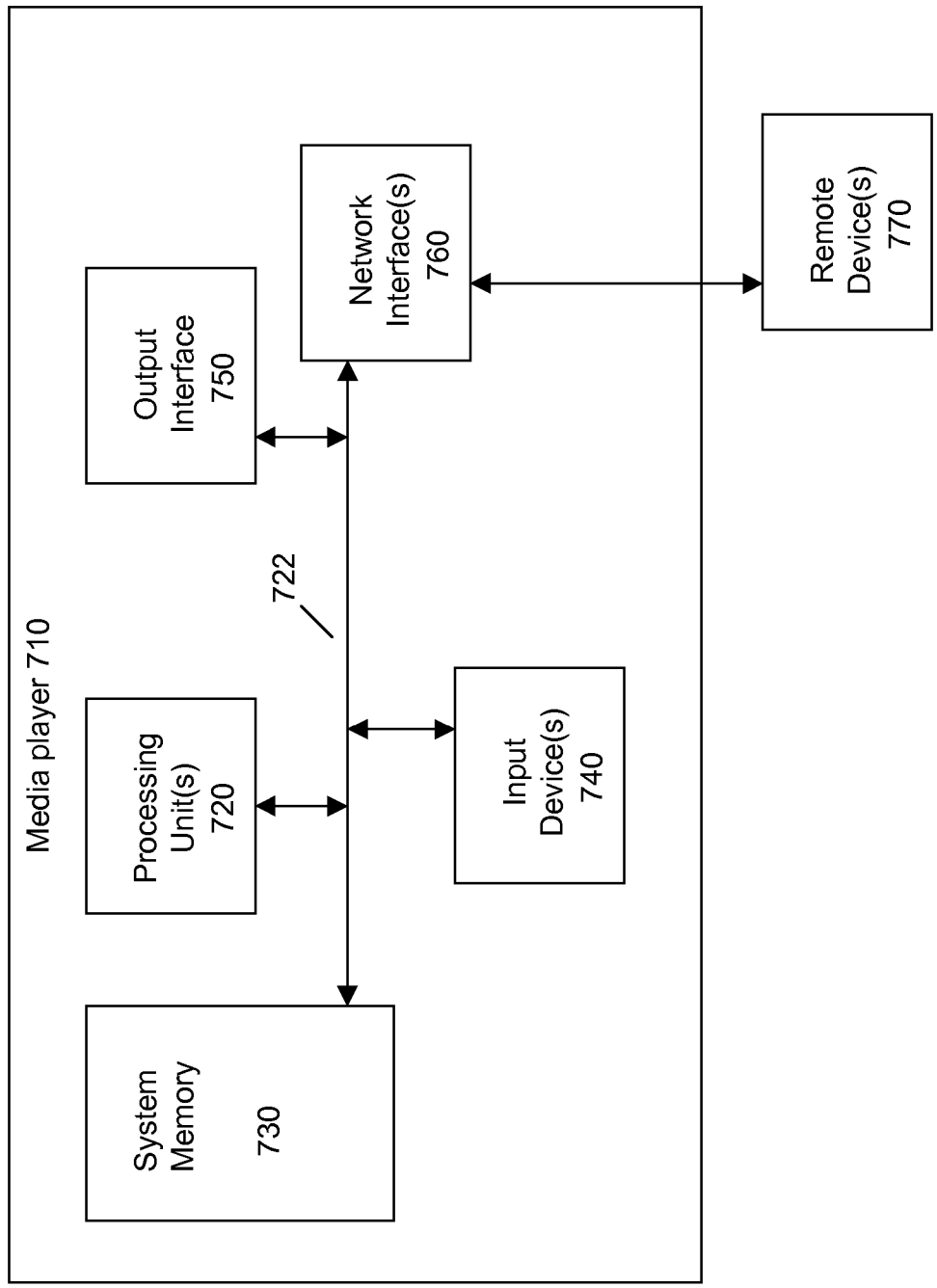
FIG. 7 illustrates an example media player.

Referring to FIG. 7, it will be readily understood that embodiments can be implemented using any of a wide variety of devices or combinations of devices. An example device that may be used in implementing one or more embodiments includes a computing device in the form of a media player 810, such as a BLU-RAY DISC player. In this regard, the media player 710 may execute program instructions configured to select a recommended feature and perform other functionality of the embodiments, as described herein.

Components of media player 710 may include, but are not limited to, processing units 720, a system memory 730, and a system bus 722 that couples various system components including the system memory 730 to the processing unit 720. Media player 710 may include or have access to a variety of computer readable media, such as system memory and/or on a multi-media disc. The system memory 730 may include computer readable storage media in the form of volatile and/or nonvolatile memory such as read only memory (ROM) and/or random access memory (RAM), and/or a binding unit/hard drive. By way of example, and not limitation, system memory 730 may also include an operating system, application programs, other program modules, and program data.

A user can interface with (for example, enter commands and information) the media player 710 through input devices 740, which can include remote input devices. A monitor, HD television set, or other type of display device can also be connected to the system bus 722 via an interface, such as an output interface 750. In addition to a monitor, media players may also include other peripheral output devices. The media player 710 may operate in a networked or distributed environment using logical connections to one or more other remote computers or databases. The logical connections may include a network, such local area network (LAN) or a wide area network (WAN), but may also include other networks/buses.

It should be noted as well that embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. A method comprising:
   at a multi-media disc player, storing a preference file comprising at least one of:

a record of content on a first multi-media disc selected by a user from a plurality of content files to play; and a record of content on a second multi-media disc selected by a user from a plurality of content files to play;

responsive to receiving the second multi-media disc in the multi-media disc player, reading the preference file; and based on the preference file, recommending, by display of a graphic in a main disc menu of the second multi-media disc, at least one content file from the plurality of content files on the second multi-media disc for the user to play;

said main disc menu comprising:

a play button to play a movie of the second multi-media disc; and the graphic visually offset from the play button and including a thumbnail of the at least one content file recommended, wherein the at least one content file recommended comprises a content file selected from the group consisting of bonus material content, sneak peak content, and game content.

2. The method of claim 1, further comprising, based on the preference file, selecting a category among a plurality of categories of content files on the second multi-media disc.

3. The method of claim 1, wherein the plurality of content files on the second multi-media disc comprise at least one of a game related to the movie contained on the second multi-media disc and a bonus video related to the movie.

4. The method of claim 1, wherein the preference file comprises data from a network on content files selected by other viewers.

5. The method of claim 1, further comprising, based on the preference file, sorting the content files on the second multimedia disc in an order to recommend to the user to play.

6. The method of claim 5, wherein the recommending further comprises displaying, prior to playing the movie of the second multi-media disc, the main disc menu of the second multi-media disc to the user to select a content file from the plurality of content files on the second multi-media disc for the user to play.

7. A method comprising:

at a multi-media disc player, storing a preference file comprising at least one of:

an indication of a content file on a first multi-media disc to recommend to a user from a plurality of content files available to play from the first multi-media disc; and a record of content on the first multi-media disc selected by other viewers from the plurality of content files available to play from the first multi-media disc;

responsive to receiving the first multi-media disc in the multi-media disc player, reading the preference file; and based on the preference file, recommending, by display of a graphic in a main disc menu of the first multi-media disc, at least one content file from the plurality of content files on the first multimedia disc for the user to play;

said main disc menu comprising:

a play button to play the movie of the first multi-media disc; and the graphic visually offset from the play button and including a thumbnail of the at least one content file recommended, wherein the at least one content file recommended comprises a content file selected from the group consisting of bonus material content, sneak peak content, and game content.

8. The method of claim 7, further comprising, based on the preference file, selecting a category among a plurality of categories of content files on the first multi-media disc.

9. The method of claim 7, wherein the plurality of content files on the first multi-media disc comprise at least one of a game related to the movie contained on the first multi-media disc and a bonus video related to the movie.

10. The method of claim 7, wherein the preference file comprises data from a network on content files selected by the other viewers.

11. The method of claim 7, further comprising, based on the preference file, sorting the content files on the first multi-media disc in an order to recommend to the user to play.

12. The method of claim 11, wherein the recommending further comprises displaying, prior to playing the movie of the first multi-media disc, the main disc menu of the second multi-media disc to the user to select a content file from the plurality of content files on the first multi-media disc for the user to play.

* * * * *